United States Patent
Lin

(10) Patent No.: US 7,182,398 B2
(45) Date of Patent: Feb. 27, 2007

(54) GLOWING VEHICLE RADIATOR GRILLE

(76) Inventor: Kuo-Hsing Lin, 1Fl., No. 26, Kan Chou St., Situn Dist., Taichung City (TW)

( * ) Notice: Subject to any disclaimer, the term of this patent is extended or adjusted under 35 U.S.C. 154(b) by 20 days.

(21) Appl. No.: 11/049,473

(22) Filed: Feb. 2, 2005

(65) Prior Publication Data
US 2005/0236870 A1    Oct. 27, 2005

(30) Foreign Application Priority Data
Apr. 22, 2004   (TW) ............................ 93206229 U

(51) Int. Cl.
*B60Q 1/28* (2006.01)
(52) U.S. Cl. .................. 296/193.1; 293/115; 362/496; 362/502
(58) Field of Classification Search ............. 296/193.1, 296/1.04, 1.07; 40/204, 547; 293/115; 362/496, 362/502, 543, 544, 545
See application file for complete search history.

(56) References Cited

U.S. PATENT DOCUMENTS

| | | | | |
|---|---|---|---|---|
| 2,196,815 | A | * | 4/1940 | Gonzalez .................... 362/496 |
| 6,986,597 | B2 | * | 1/2006 | Elwell ........................ 362/496 |
| 2006/0114686 | A1 | * | 6/2006 | Liu ............................ 362/496 |

* cited by examiner

*Primary Examiner*—Jason Morrow
(74) *Attorney, Agent, or Firm*—Egbert Law Offices

(57) ABSTRACT

A glowing vehicle radiator grille includes multiple ribs securely connected to one another via a connection device for connection to the vehicle radiator, multiple light transmitting groups each securely connected to a corresponding one of the ribs and multiple illuminators each received in a corresponding one of the light transmitting groups to allow light from the illuminators to be transmitted by the light transmitting groups so as to light ambient atmosphere surrounding the ribs.

3 Claims, 5 Drawing Sheets

GLOWING VEHICLE RADIATOR GRILLE

BACKGROUND OF THE INVENTION

1. Field of the Invention

The present invention relates to a vehicle radiator grille, and more particularly to a glowing vehicle radiator grille so as to increase warning effect to others when the vehicle is either on the move or parked on the street.

2. Description of Related Art

When a vehicle is moving on the street, the very first thing the pedestrian in front of the vehicle sees is the vehicle radiator. During the daytime, people are alert to the oncoming vehicle and will avoid it. However, during the hours of darkness and low visibility, people are not so aware of vehicles as they are during the daytime. Because there are so many headlights from different vehicles passing around the streets, people are sometimes careless to watch over their own safety and get hit by a passing vehicle. Especially, when the driver is careless and forgets to turn on the vehicle's headlights, a pedestrian may not see the oncoming vehicle. Further, when the vehicle is parked on a dark street, due to the lack of illumination a pedestrian may easily bump into the parked vehicle.

To overcome the shortcomings, the present invention tends to provide an improved vehicle radiator grille to mitigate the aforementioned problems.

SUMMARY OF THE INVENTION

The primary objective of the present invention is to provide a glowing vehicle radiator grille to attract people's attention so as to avoid accidents.

In order to accomplish the aforementioned objective, the vehicle radiator grille has multiple laterally extending ribs, multiple light transmitting groups respectively corresponding and connected to one of the ribs and multiple illuminators each received in a corresponding one of the light transmitting groups so that after the vehicle radiator grille is attached to the vehicle radiator via a connection device, light from the illuminators in the light transmitting groups is able to attract people's attention so as to avoid accidents.

Other objects, advantages and novel features of the invention will become more apparent from the following detailed description when taken in conjunction with the accompanying drawings.

DETAILED DESCRIPTION OF THE PREFERRED EMBODIMENT

Figure 1:
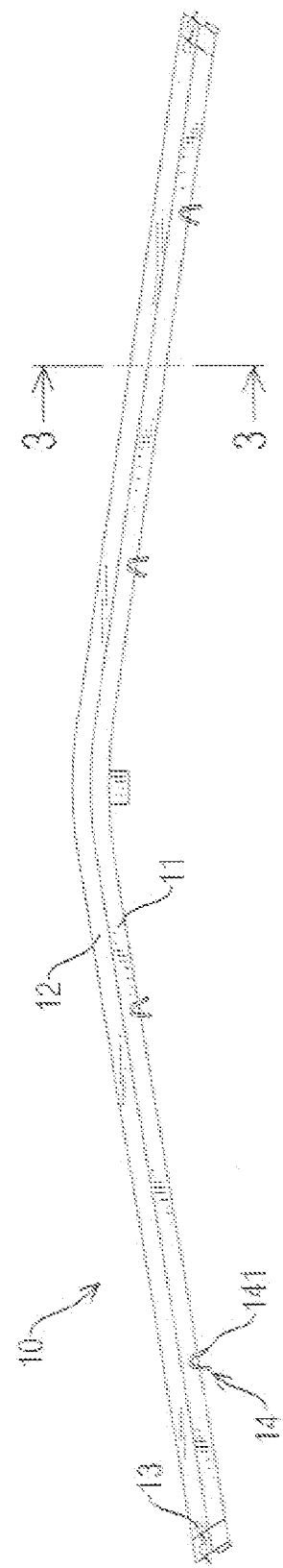
FIG. 1 is a top plan view of the vehicle radiator grille of the present invention.
Figure 2:
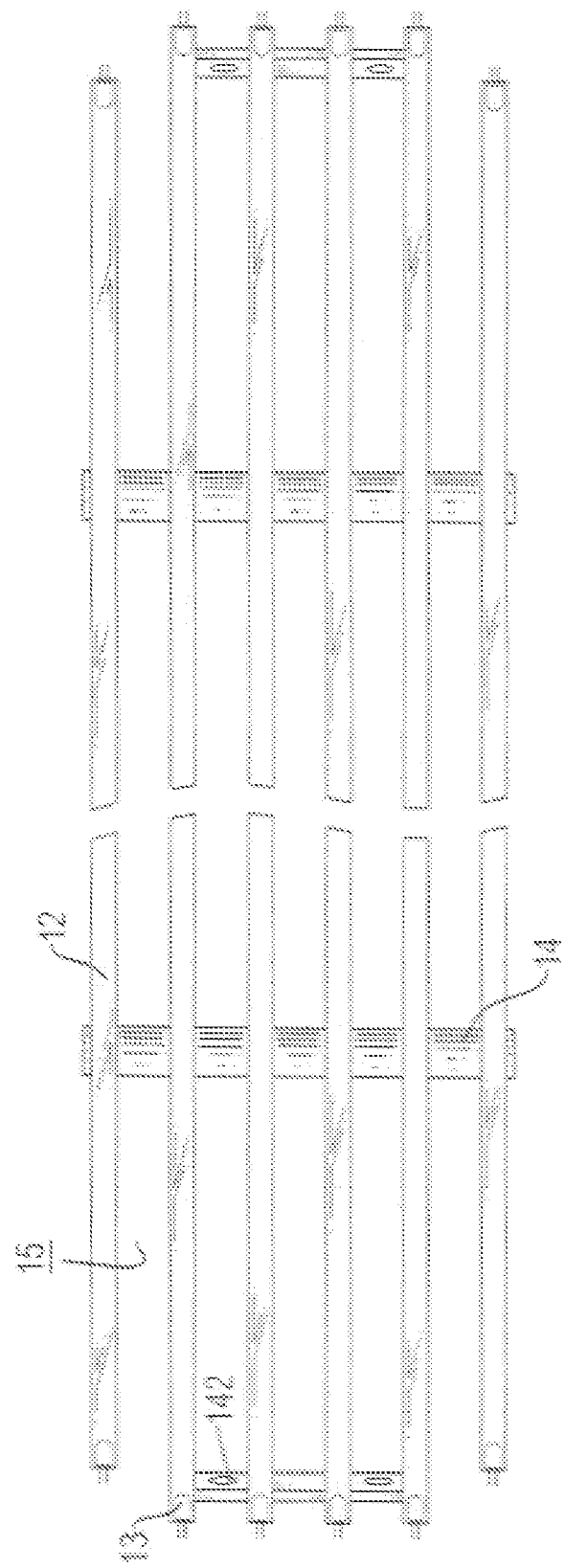
FIG. 2 is a front plan view of the vehicle radiator grille in FIG. 1.
Figure 3:
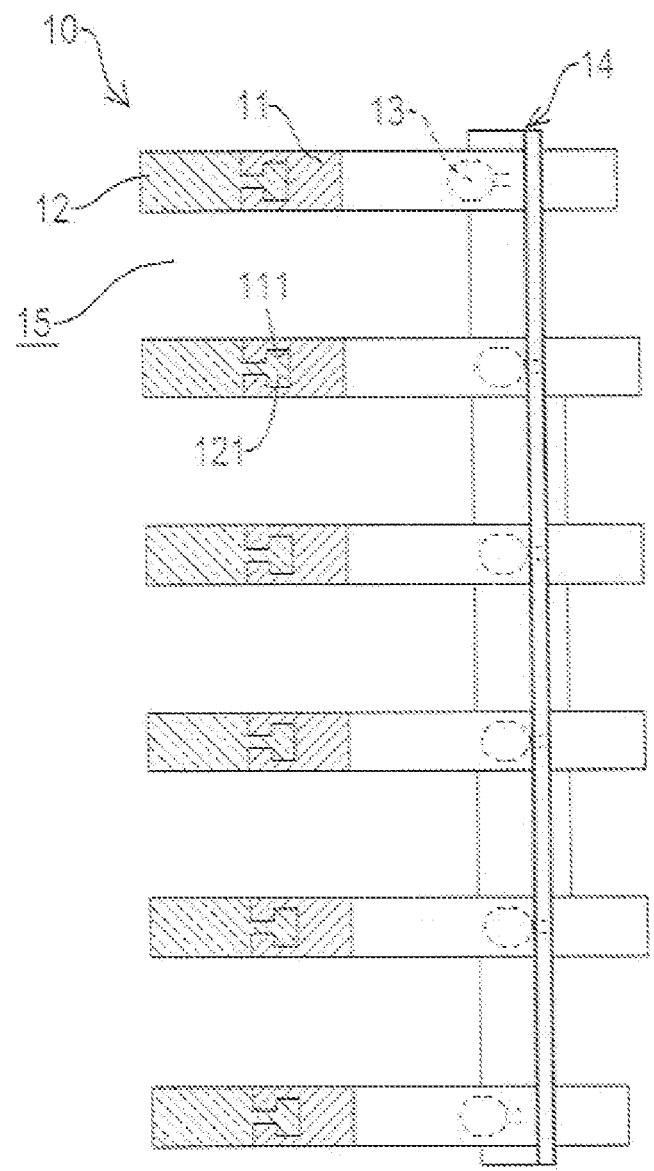
FIG. 3 is a cross sectional view taken from line 3—3 in FIG. 1.

With reference to FIGS. 1, 2 and 3, it is noted that the vehicle radiator grille (10) constructed in accordance with the present invention includes multiple laterally extending ribs (11), multiple light transmitting groups (12) and multiple illuminators (13).

The ribs (11) are connected to each other via a connection device (14) which includes multiple connecting boards (141). Each connecting board (141) is orthogonally connected to the ribs and has through holes (142) defined through the connecting board (141) such that the vehicle radiator grille (10) is able to be mounted on the vehicle radiator via rivets extending through the through holes (142). Each rib (11) is spaced apart from one another so that a gap (15) is defined between two adjacent ribs (11). The rib (11) is securely connected to a corresponding one of the light transmitting groups (12). One embodiment, as shown in FIG. 3, of the connection between the rib (11) and the light emitting groups (12) shows that one end of the rib (11) has a dovetailed recess (111) and one end of the light emitting groups (12) has a dovetailed protrusion (121) complementary to the dovetailed recess (111) such that the dovetailed protrusion (121) is able to be snugly received in the corresponding dovetailed recess (111) to connect the rib (11) to the corresponding light emitting group (12). Each illuminator (13) is received in one of the light emitting groups (12) and is preferably a light emitting diode (LED). Therefore, light from the illuminator (13) is able to be transmitted by the light transmitting group (12) and illuminates ambient atmosphere surrounding each of the ribs (11). As a consequence of the continuous lighting effect from the illuminators (13) in the light transmitting groups (12), the vehicle radiator grille (10) of the present invention attracts people's attraction in both daytime and night time and thus accidents are reduced.

Figure 4:
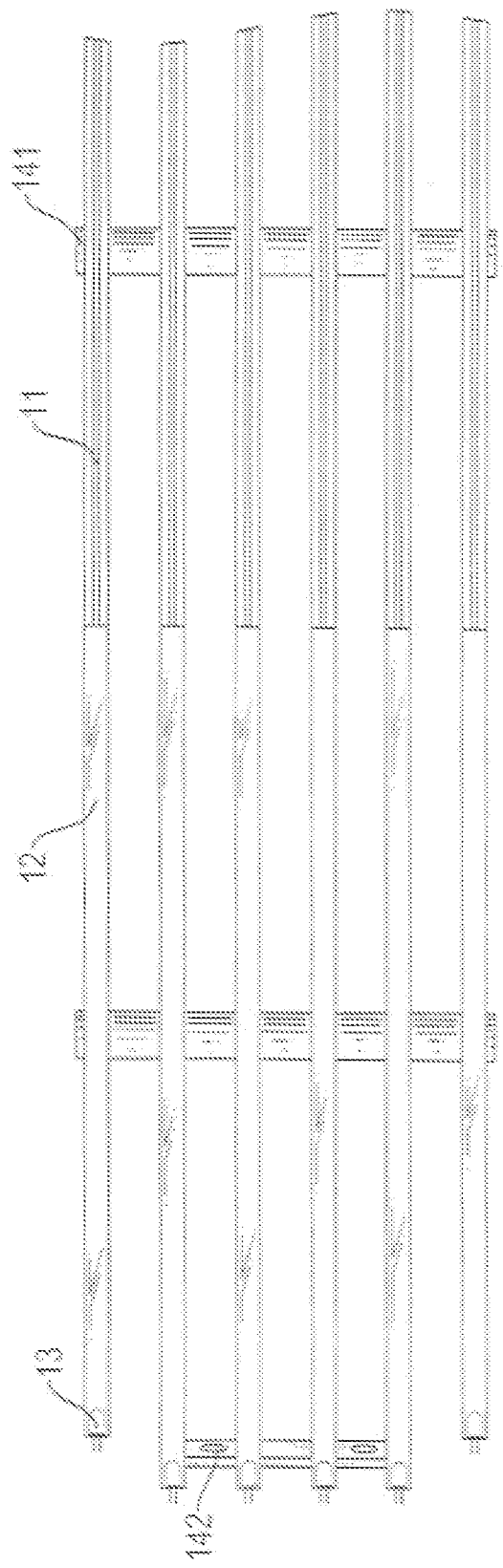
FIG. 4 is a front plan view of the vehicle radiator grille of the second embodiment of the present invention.
Figure 5:
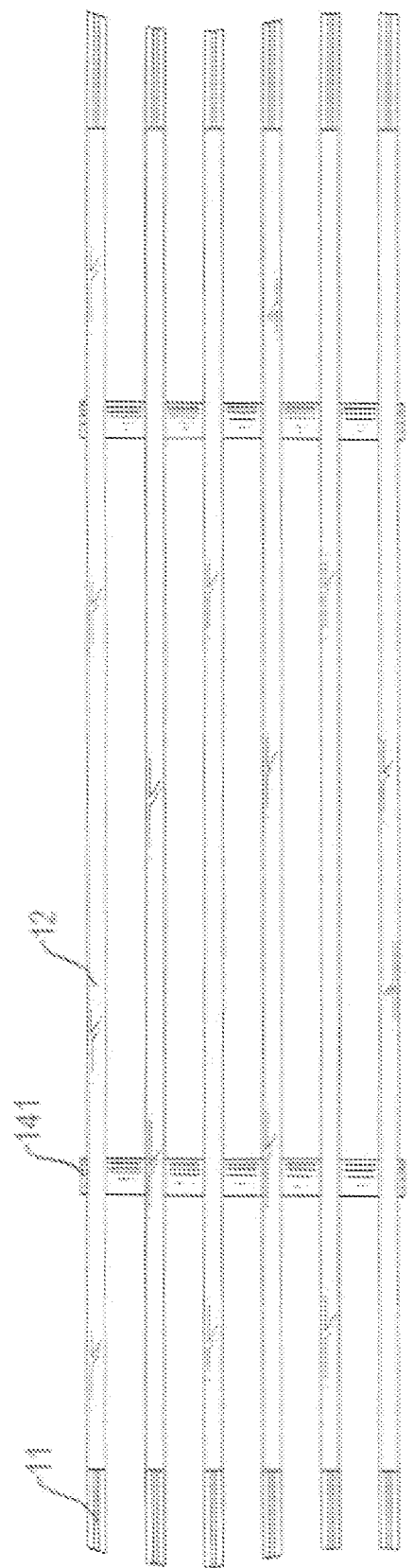
FIG. 5 is a front plan view of the vehicle radiator grille of the third embodiment of the present invention.

With reference to FIGS. 4 and 5, it is noted that each light transmitting group (12) has a length equal to or shorter than that of the corresponding rib (11).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A glowing vehicle radiator grille comprising:
   a plurality of laterally extending ribs securely connected to one another via a connection device, said connection device adapted to connect to the vehicle radiator, said connection device having a plurality of connecting boards, each connecting board of said plurality of connecting boards being securely connected to the plurality of laterally extending ribs, the connecting board having multiple holes extending therethrough suitable for connection to the vehicle radiator;
   a plurality of light transmitting groups respectively connected to said plurality of laterally extending ribs, each light transmitting group of said plurality of light transmitting groups having an end with a dovetailed protrusion, each of said plurality of laterally extending ribs having a dovetailed recess complementary to said dovetailed protrusion, said dovetailed protrusion received in said dovetailed recess so as to securely connect the light transmitting group to the rib; and
   a plurality of illuminators respectively received in said plurality of light transmitting groups so as to allow light from said plurality of illuminators to be transmitted by said plurality of light transmitting groups so as to illuminate ambient atmosphere surrounding said plurality of laterally extending ribs.

2. The glowing vehicle radiator grille of claim 1, each of said plurality of light transmitting groups having a length equal to a length of one of said plurality of laterally extending ribs.

3. The glowing vehicle radiator grille of claim 1, each of said plurality of light transmitting groups has a length that is shorter than a length of one of said plurality of laterally extending ribs.

* * * * *